Figure 1:
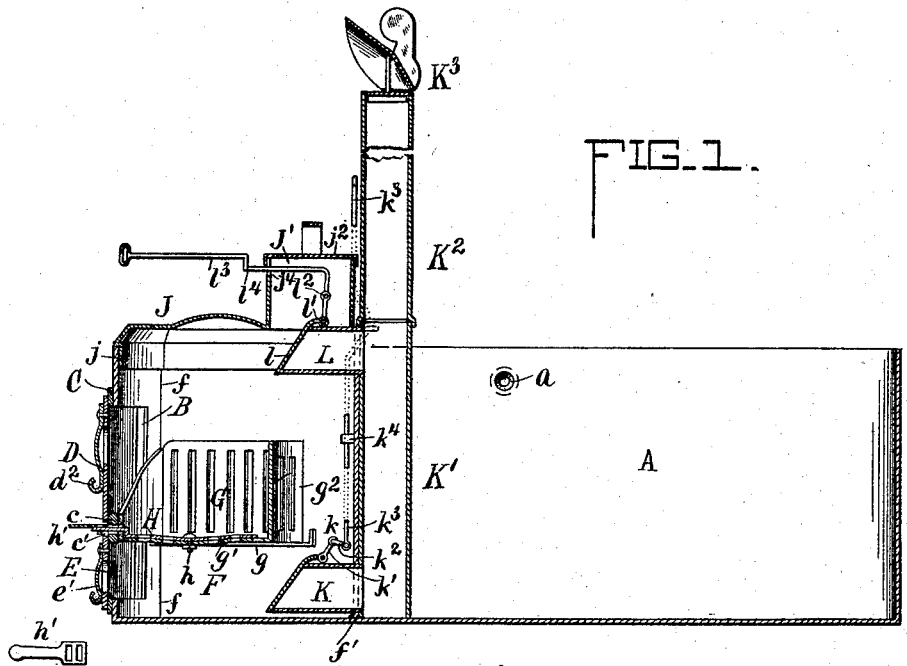

No. 638,063. Patented Nov. 28, 1899.
E. C. PAWLEY & W. H. MILLER.
COMBINED TANK AND TANK HEATER.
(Application filed June 15, 1899.)

(No Model.)  2 Sheets—Sheet 1.

WITNESSES  
W. E. Allen.  
Chas. W. Parker.

INVENTORS  
E. C. Pawley  
Wm. H. Miller  
by Milo B. Stevens & Co.  
Attorneys

No. 638,063. Patented Nov. 28, 1899.
E. C. PAWLEY & W. H. MILLER.
COMBINED TANK AND TANK HEATER.
(Application filed June 15, 1899.)
(No Model.) 2 Sheets—Sheet 2.
FIG_3_
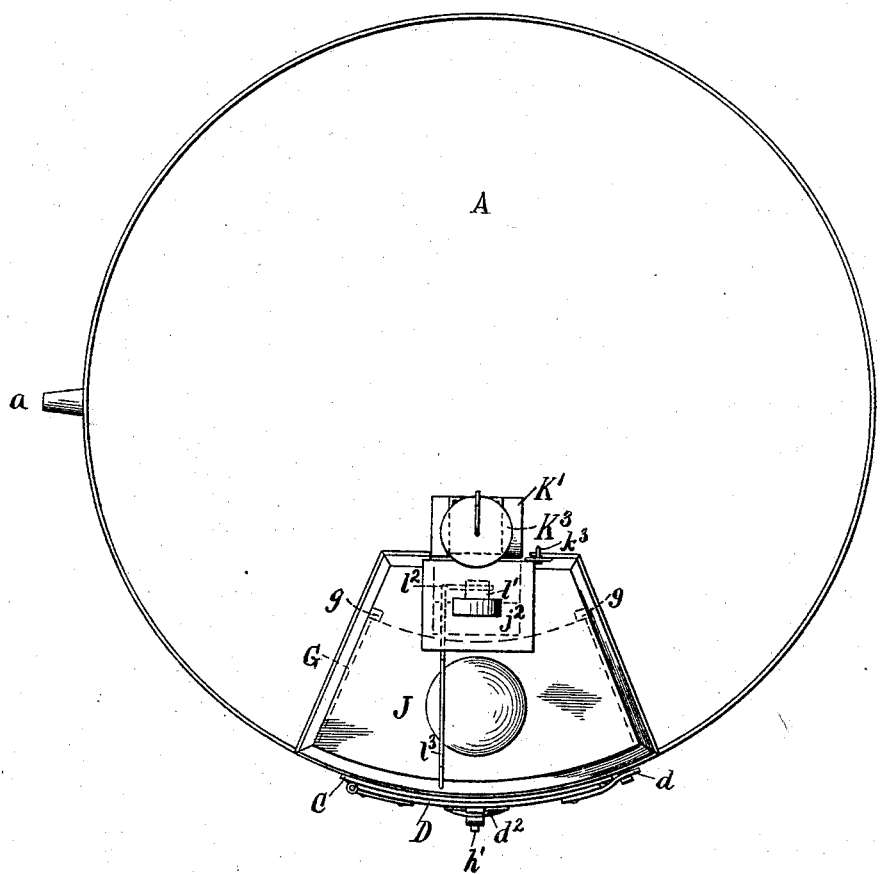
WITNESSES
W. E. Allen
Chas W. Parker
INVENTORS
E. C. Pawley & Wm H. Miller
by Milo B Stevens & Co
Attorneys

UNITED STATES PATENT OFFICE.

ERNEST C. PAWLEY AND WILLIAM H. MILLER, OF SHELDON, ILLINOIS.

COMBINED TANK AND TANK-HEATER.

SPECIFICATION forming part of Letters Patent No. 638,063, dated November 28, 1899.

Application filed June 15, 1899. Serial No. 720,702. (No model.)

*To all whom it may concern:*

Be it known that we, ERNEST C. PAWLEY and WILLIAM H. MILLER, citizens of the United States, residing at Sheldon, in the county of Iroquois and State of Illinois, have invented certain new and useful Improvements in a Combined Tank and Tank-Heater; and we do hereby declare the following to be a full, clear, and exact description of the invention, such as will enable others skilled in the art to which it appertains to make and use the same.

This invention relates to improvements in a combined tank and tank-heater of that class specially designed for heating water for agricultural or stock purposes and for cooking stock-feed, &c.

The objects of the invention are to improve the construction of such devices to enable the best results being produced in the use thereof, to so construct the tank and tank-heater that the greatest heating effect can be produced at the minimum cost and labor, so that water can be heated to a degree sufficient to cook food and keep it or the water from freezing at the lowest temperatures, to obtain greater heating-surface, to so construct the heater that it can be operated with the greatest ease and access can be had for repairing and similar purposes, to so arrange the several parts of the heater that the same can be easily operated from without the tank, to so arrange the dampers and operating means therefor that they also can be operated from without the tank, to provide the largest possible grate capacity, to provide a removable top or cover for the heater and so proportion the parts that access can be had to the heater from the top and the parts—such as the grate, &c.— can be removed, to provide a double-draft arrangement with suitable dampers whereby a direct upper draft can be obtained or the entire heat thrown downward or toward the base of the heater and tank, and to produce a heater of generally improved and simplified construction.

With such objects in view the invention is embodied in the several parts, combinations and arrangements of parts, as hereinafter described, and particularly set forth in the claims.

In the accompanying drawings we have illustrated one form of the invention, which we now deem preferable; but we do not limit the improvements in their useful applications to the particular construction shown, as minor changes may be made without departing from the scope of our invention.

Figure 2:
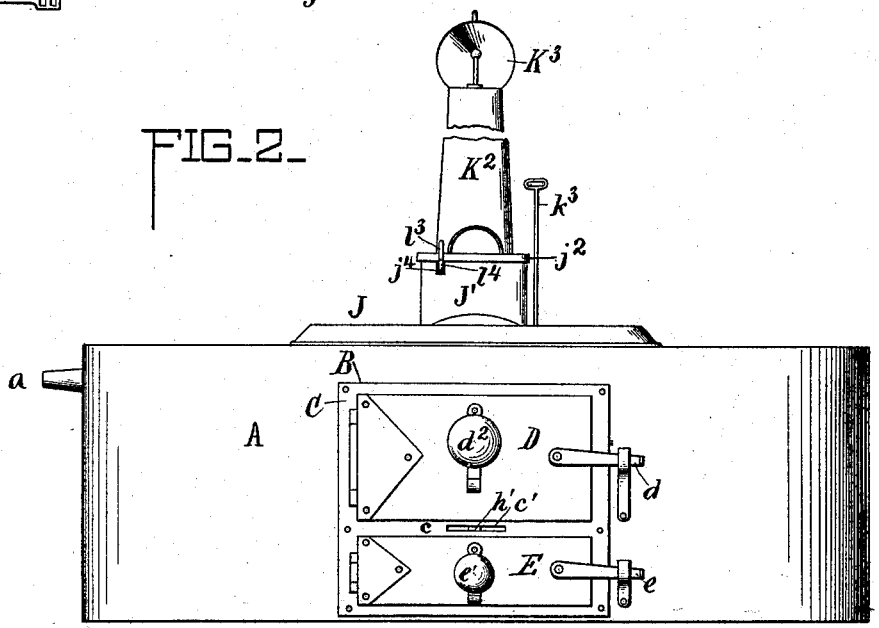

In said drawings, Figure 1 is a sectional view through a tank and heater embodying our improvements. Fig. 2 is an elevation showing the front portion of the heater. Fig. 3 is a plan view showing the heater.

Referring to the drawings, wherein similar characters designate similar parts throughout the several views, A designates a tank of any suitable or desired form and size. It is here shown as being circular and constructed of sheet metal.

$a$ indicates a suitable overflow-spout.

At one side the vertical wall of the tank A is provided with a large rectangular opening B. To the wall of the tank, surrounding this opening, is secured a door-frame (indicated at C) which is provided with a horizontal bar $c$, dividing the door-opening into an upper and lower opening. Hinged to the frame C at one side is a door D, provided with a suitable holding means or latch $d$ and with a sight and draft opening closed by a cover $d^2$, pivoted to the door. E represents a similar door hinged to the frame below the door D and, like it, provided with a sight and draft opening having a closing-cover $e'$ and a suitable holding means or latch $e$. Suitable keepers are provided for the door-latches.

Within the tank A and secured to the vertical wall thereof in a water-tight manner, as at $ff$, is a partition F, constituting the stove or heater casing. This casing is secured also to the bottom of the tank in a water-tight manner, as by flanges $f'$ and solder, as indicated. The casing or partition F, as shown in the drawings, together with the vertical wall of the tank A, constitutes a water-tight compartment of substantially segmental shape, extending well into the tank and including the door-opening B. Within the casing and secured to the side walls thereof at $g$ are supporting cleats or brackets for a removable grate. G indicates this removable grate, which, as shown, is in the nature of a basket-grate having the perforated bottom and vertical walls indicated, respectively, at $g'$ and $g^2$.

The front wall of the grate is comparatively low to permit access to the grate through the upper door E. The grate is in shape substantially that of the casing F, but terminates at a distance from the rear wall of the casing F. This is to permit ready removal of the grate from the casing through the open top of the latter. Supported on the grate-bottom and rotatable on a stud is a perforated plate H, having an extension $h$, projecting through an elongated slot $c'$ in the horizontal cross-bar $c$ of the door-frame. This plate constitutes a shaker. A removable handle, such as indicated at $h'$, is provided for engaging the extension of said plate H for the purpose of oscillating the same on its stud for shaking the fuel in a well-known manner.

J indicates a removable top for the casing F, provided with suitable depending and horizontal flanges $j$ for properly fitting and supporting it on the casing. The cover effectually covers the top of the casing and with it and the wall of the tank completes the heater or stove inclosure.

In rear of the casing F is a vertical flue or stack $K'$, having a horizontal branch or extension K, entering the casing F below the grate G, and L is a similar flue branch or extension entering the heater-casing above the grate. The flue branches K and L are provided with dampers $k$ and $l$, respectively. The damper $k$ has a rearwardly-extending arm $k'$, pivotally connected to a horizontal finger $k^2$ on a vertically-extending operating-rod $k^3$ for the damper, which is slidingly mounted in brackets $k^4$ on the rear wall of the casing F. The operating-rod $k^3$ extends upwardly through an opening in the removable cover J and is provided at its end with an operating-handle. The damper $l$ is pivoted to the flue extension L and has a rearwardly-extending arm $l'$, pivotally connected to a horizontal finger $l^2$ on an operating-rod $l^3$ therefor. As will be seen, this operating-rod $l^3$ extends through an opening $l^4$ in the vertical wall of a boxing (indicated at $J'$) on the removable cover J and has a bent portion or shoulder adapted to engage the wall of the boxing $J'$ and hold the damper $l$ in its opened position. A removable cover $j^2$ is provided for the boxing $J'$.

The vertical flue $K'$ is shown as provided with an upper removable extension $K^2$, provided at its top with a pivoted hood $K^3$.

Such being the construction our heater is adapted to operate in substantially the following manner: The operator builds the fire on the grate in the usual manner, and when the fire is first started the bottom damper $k$ is closed and the upper damper $l$ opened to give a direct draft and permit a quick fire. After the fire has well started the lower damper is opened and the upper damper closed. A draft is created through the draft-opening in the upper door E, down through the grate, and through the lower flue extension K, thus directing the fire to the bottom and rear of the heater, effectually heating the contents of the tank and preventing a rapid combustion of the fuel. The dampers are readily operated from the front of the heater by the operating-rod heretofore described. Should it be desired to gain access to the interior of the heater for any purpose, the top J is removed. When the top J has been removed, the grate can be easily taken from the heater through the open top for the purpose of repairing, replacing, or the like. The bottom door of the heater E affords ready access to the ash-pot beneath the grate.

Having thus described the invention, what we claim as new, and desire to secure by Letters Patent, is—

1. In a combined tank and tank-heater, the combination of a tank having an opening in the vertical wall thereof, a partition within the tank extending substantially to the top of the tank and secured to the wall at each side of said opening and forming with said wall a heater in said tank, a grate within said heater opposite said opening through which latter the fuel is fed to the grate, a door for said opening, and a removable top for said heater, substantially as and for the purpose described.

2. In a combined tank and tank-heater, the combination with a tank having a filling-opening in a vertical wall thereof, of a door for said opening, a substantially U-shaped partition within said tank and extending from the bottom substantially to the top of the tank and secured to the said vertical wall at each side of said opening and to the tank-bottom and forming with the tank wall and bottom a heater in said tank, a removable top for said heater, and a grate removably supported in said heater adjacent said filling-opening and adapted to be fed therethrough and adapted to be removed through the open upper end of said heater when the top is removed, substantially as set forth.

3. In a combined tank and tank-heater, the combination with the tank, of a heater located therein at one side and having a grate and an upper and lower draft-door in the tank side, a flue or stack located in the tank outside of and adjacent said heater, branch flues entering the heater one above and one below the grate, and dampers for said branch flues, substantially as set forth.

4. In a combined tank and tank-heater, the combination with the tank, of a heater therein, a vertical flue for said heater located within the tank outside of and adjacent the heater at the rear thereof and having an upper and lower horizontal branch flue entering said heater, a grate supported in said heater between said branch flues, a draft-door above said grate, and a draft-door below said grate, substantially as described.

5. In a combined tank and tank-heater, the combination with the tank, of a heater therein, a flue for said heater within the tank outside the heater and adjacent the same and having horizontal branch flues entering the heater, a hinged damper for each branch flue, an operating-rod for the lower damper slidably mounted in bearings on the heater-casing, a forwardly-extending operating-rod for the upper flue-damper pivotally connected to the same, and means for holding said rod to retain said damper in an open position, substantially as described.

In testimony whereof we affix our signatures in presence of two witnesses.

ERNEST C. PAWLEY.
WILLIAM H. MILLER.

Witnesses:
E. E. MENDENHALL,
O. W. HATHAWAY.